Figure 4:
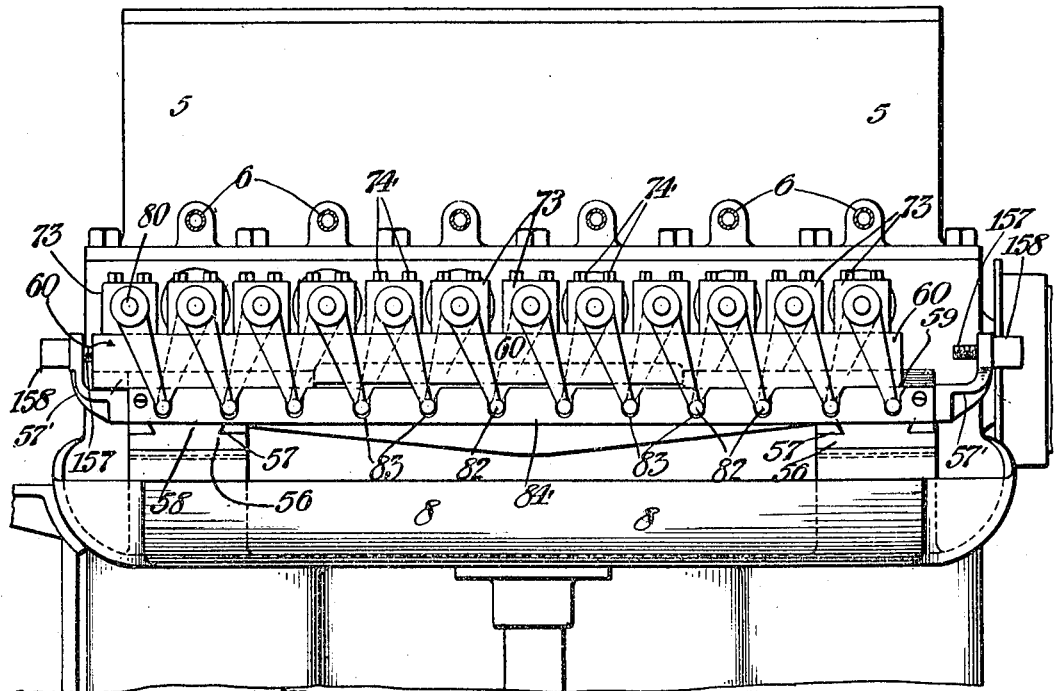

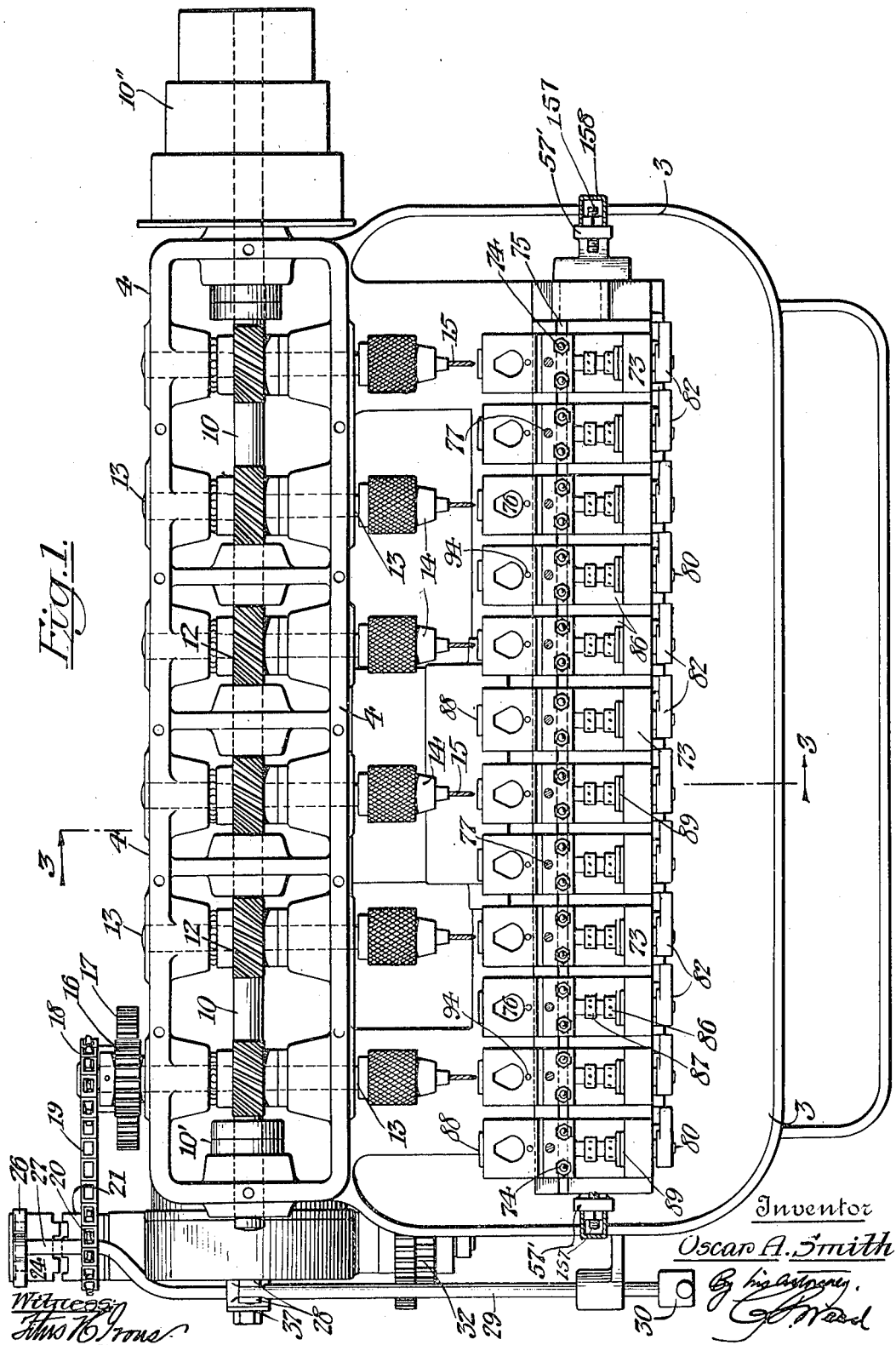

O. A. SMITH.
DRILLING MACHINE.
APPLICATION FILED AUG. 7, 1916.
1,256,180.
Patented Feb. 12, 1918.
6 SHEETS—SHEET 2.
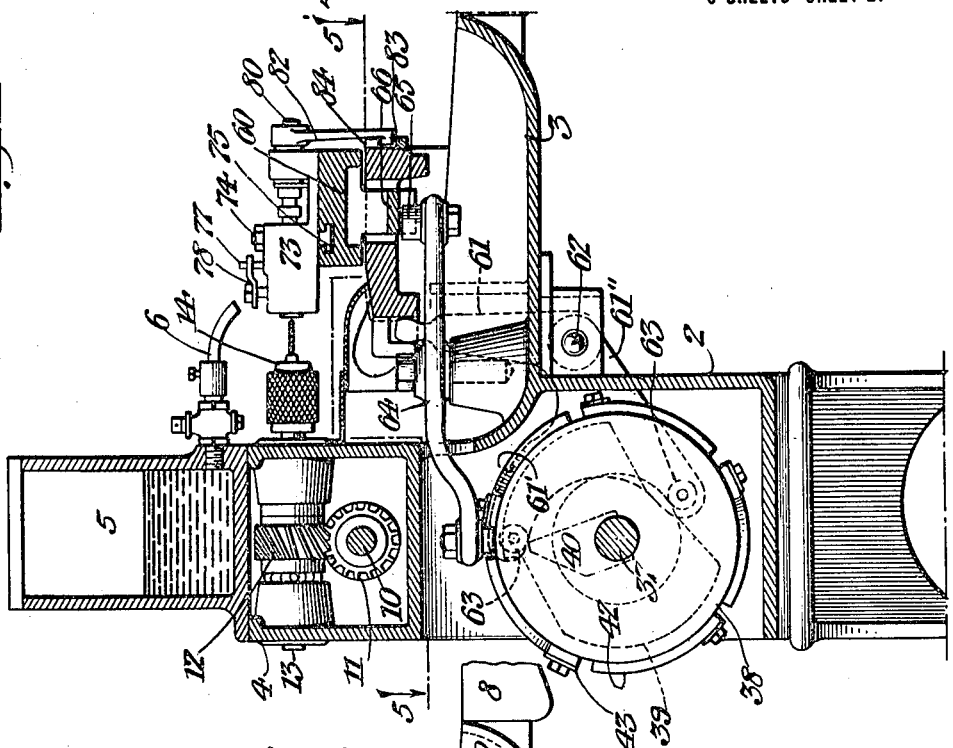
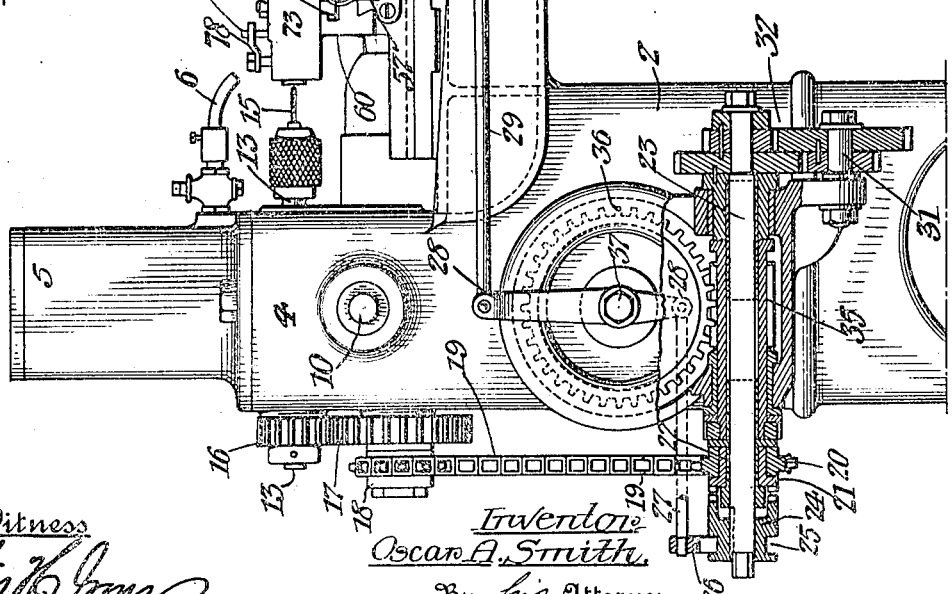
Inventor
Oscar A. Smith.
By his Attorney

O. A. SMITH.
DRILLING MACHINE.
APPLICATION FILED AUG. 7, 1916.

1,256,180.

Patented Feb. 12, 1918.
6 SHEETS—SHEET 3.

Witness
John H. Jones

Inventor
Oscar A. Smith.
By his Attorney

O. A. SMITH.
DRILLING MACHINE.
APPLICATION FILED AUG. 7, 1916.
1,256,180.
Patented Feb. 12, 1918.
6 SHEETS—SHEET 4.
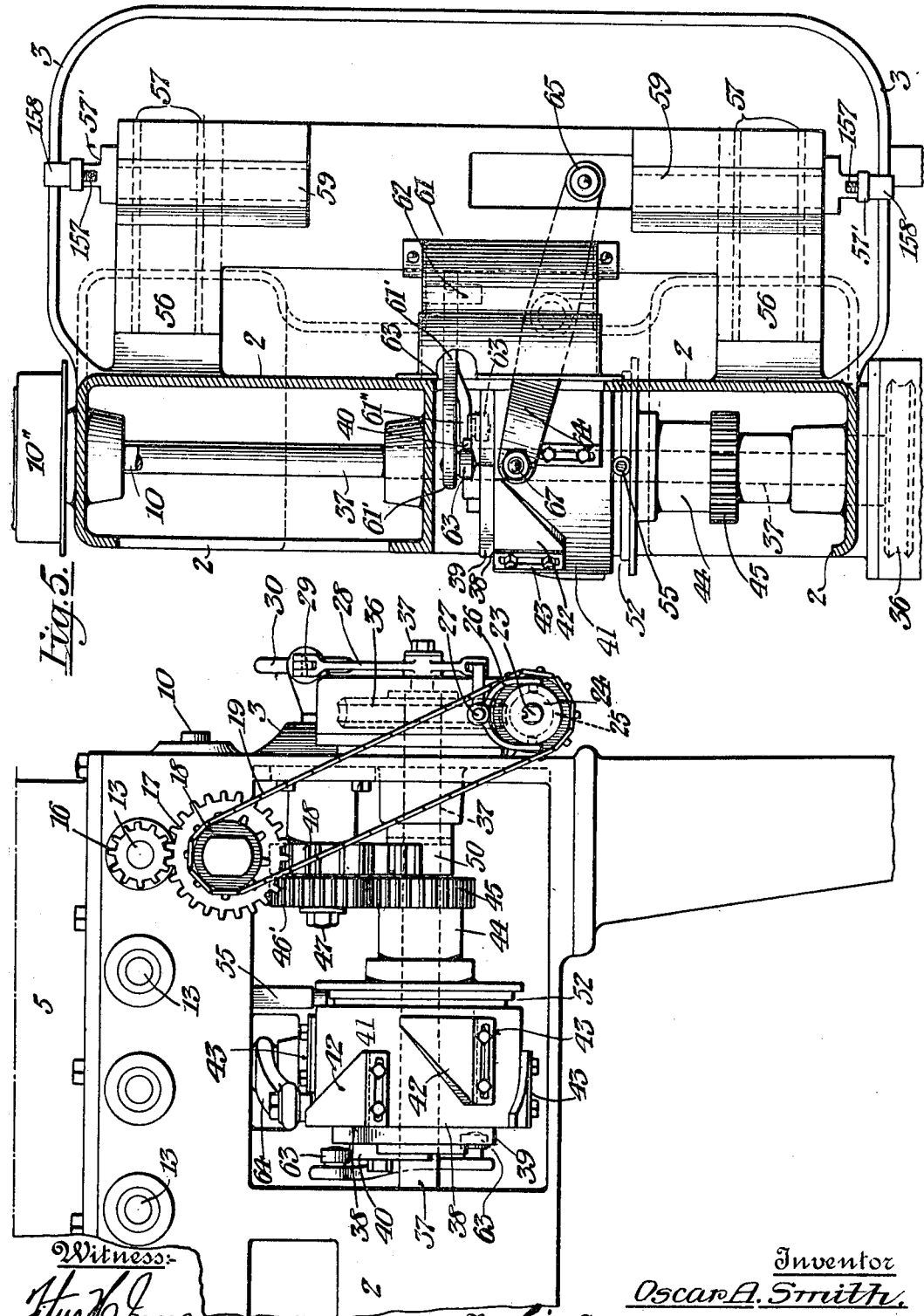

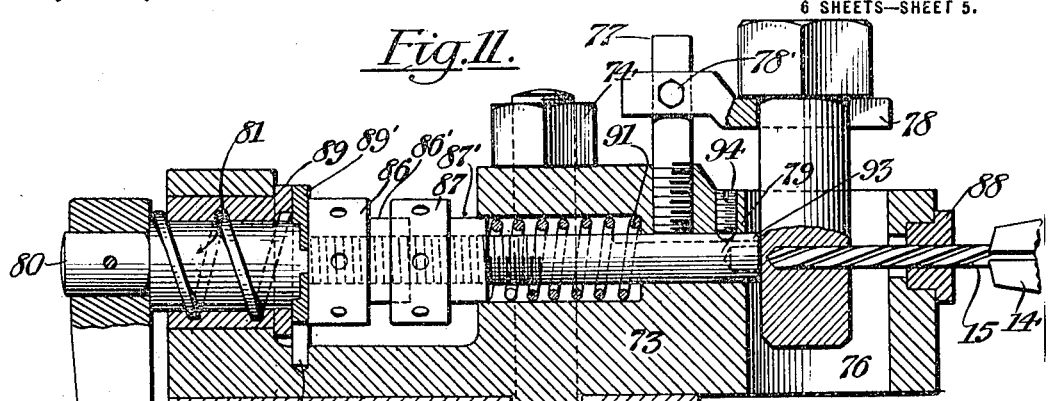

O. A. SMITH.
DRILLING MACHINE.
APPLICATION FILED AUG. 7, 1916.
1,256,180.
Patented Feb. 12, 1918.
6 SHEETS—SHEET 6.
Fig.14.
Fig.15.
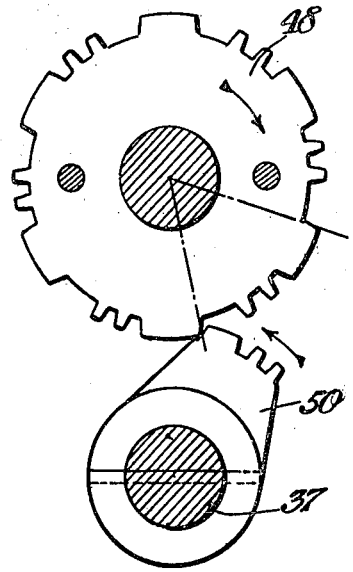
Fig.7.
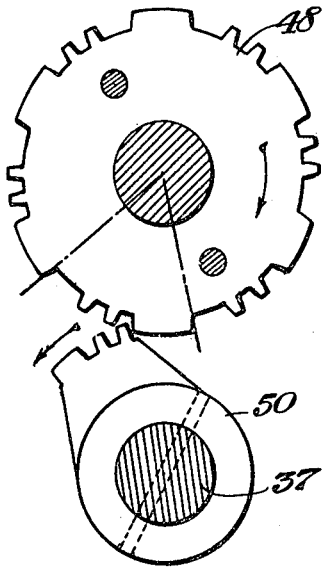
Fig.8.
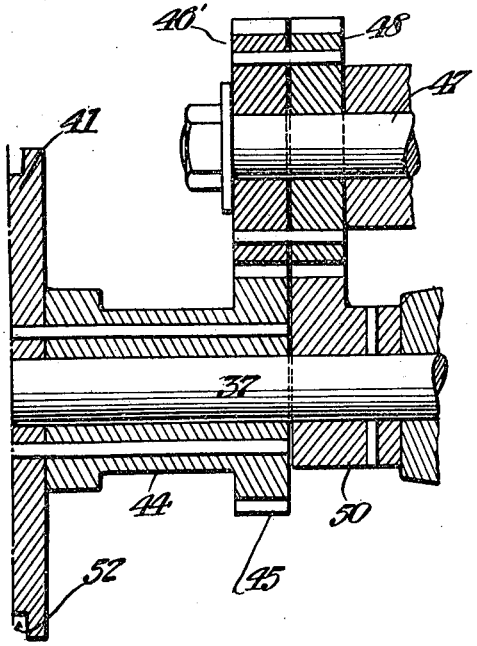
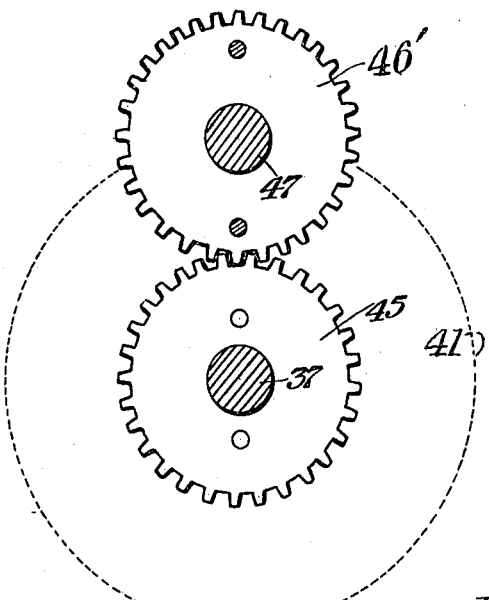
Witness:
Titus H. Ivons
Inventor:
Oscar A. Smith
by his Attorney
G. H. Reed

UNITED STATES PATENT OFFICE.

OSCAR A. SMITH, OF CLEVELAND, OHIO, ASSIGNOR, BY MESNE ASSIGNMENTS, TO THE NATIONAL-ACME COMPANY, OF CLEVELAND, OHIO, A CORPORATION OF OHIO.

DRILLING-MACHINE.

1,256,180.  Specification of Letters Patent.  Patented Feb. 12, 1918.

Application filed August 7, 1916.  Serial No. 113,428.

*To all whom it may concern:*

Be it known that I, OSCAR A. SMITH, a citizen of the United States, residing at Cleveland, in the county of Cuyahoga and State of Ohio, have invented certain new and useful Improvements in Drilling-Machines, of which the following is a specification.

This invention has to do with drilling machines, the object of the invention being to provide an improved multiplex drilling machine automatically operative for the purpose of rapidly drilling holes through or into various kinds of work, including screws, bolts and other machine parts used in the automobile trade and other industries, and in view of the fact that in the present improvement the work is fed by hand to the jigs or work holders the machine may be referred to in the art as a six-spindle semi-automatic drilling machine.

With the ordinary drilling machines the operator, before starting to drill, must release or remove the work that has been drilled and replace such work with other work to be drilled, thus losing the time required to remove the previously drilled pieces and replace undrilled pieces. In other words, with ordinary drilling machines, after a piece is drilled this piece must be removed and a new piece inserted before the drilling can continue, whereas in the present improvement the drilling continues on a number of pieces while other or a similar number of pieces are being inserted into place to be subsequently drilled, and in the present invention as six pieces are being drilled simultaneously six other previously drilled pieces are being removed and six undrilled pieces inserted in their place to be subsequently drilled, so that it is only necessary for the operator to remove the pieces previously drilled from the idle jigs or work holders, without interfering with the simultaneous operation of the machine in drilling a similar number of pieces.

One of the objects of the invention, therefore, is the provision of an improved machine which will enable the drilling of a certain number of pieces to proceed while other pieces are removed and undrilled pieces inserted in their place.

Another object of the invention is the provision of means for automatically releasing the drilled pieces and clamping the undrilled pieces in the jigs or work holders.

Another object of the invention is the provision of means for decreasing the time required for shifting or reciprocating the fixture rail carrying the jigs or work holders.

The present improvement comprises in a general way a series of tools or drills, means for simultaneously operating them, a series of blank or work holders,—in the present instance a pair thereof for each of said tools, so that in the present improvement the blank or work holders comprise twice the number of tools,—means for shifting or reciprocating the tools and the blank holders relatively to each other lengthwise of the machine or transversely of the feeding movement, means for reciprocating the tools and blank holders relatively to each other, means for decreasing the lost time of one of these elements at the proper time, and means for automatically clamping and releasing the blanks to be worked. In the present improvement the blank or work holders or jigs are reciprocated or shifted lengthwise of the machine or crosswise of the tools or drills, and the blank holders are also shifted or reciprocated toward and from the drills, and this means may be hereinafter designated as the feeding means.

Figures 9, 10:
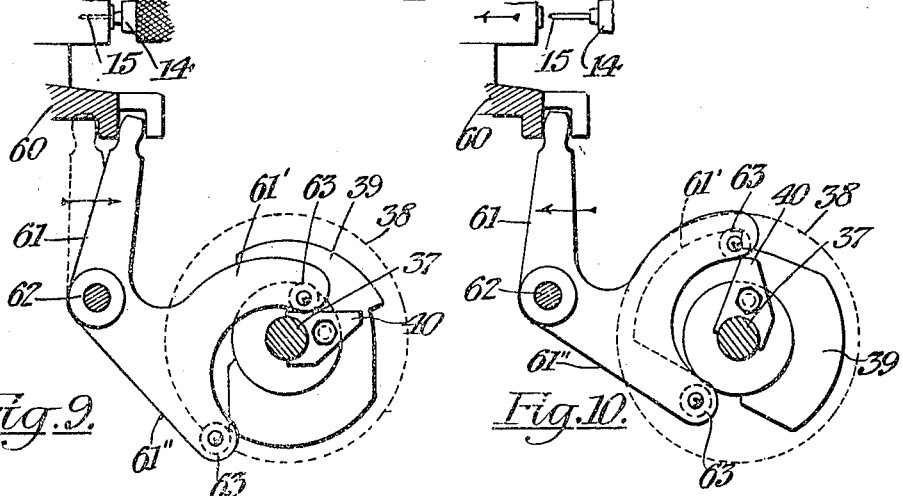

In the drawings accompanying and forming part of this specification, Figure 1 is a plan view of the preferred form of this improved machine as now embodied in a practical working apparatus; Fig. 2 is a left-hand end view of Fig. 1; Fig. 3 is a cross-sectional view taken in line 3—3, Fig. 1; Fig. 4 is a front view of a portion of the machine as shown in Fig. 1; Fig. 5 is a sectional plan view taken in line 5—5, Fig. 3; Fig. 6 is a rear view of a part of the machine as shown in Fig. 1; Figs. 7 and 8 are detail views of the gear mechanism shown in Fig. 6; Figs. 9 and 10 are detail views illustrating the means for shifting the work carrier toward and from the drills; Fig. 11 is a detail sectional view of the work clamping means; Fig. 12 is a top view thereof; Fig. 13 illustrates a piece of drilled work; and Figs. 14 and 15 show details of the index gears shown in Figs. 6, 7 and 8.

Similar characters of reference indicate corresponding parts in the different figures of the drawings.

While I have shown in the present instance the work shifted toward and from the drills and sidewise relatively thereto, with the drills rotating, it will be obvious that the reverse of this operation might be arranged without materially modifying or changing the structure, and that also the various details may be more or less changed without departing from the scope of the claims.

In the preferred form thereof shown this improved six-spindle semi-automatic drilling machine comprises a suitable bed 2 having legs or other suitable supporting means, and including a pan 3 and an upright portion 4, an oil reservoir 5 having oil supply pipes 6, one for each drill, and a blank or work holder 8 fastened to the front of the bed (see Fig. 1).

Located in the upright portion 4 of the bed, and below the oil reservoir is the main driving shaft 10, having at one end a ball thrust 10′ and at the other end a step pulley 10″, for imparting rotary motion from some suitable source of power to this driving shaft. On this shaft are secured in the present instance six driving spiral gears 11 at predetermined distances apart, and these driving spiral gears mesh with six driven spiral gears 12, each carried by a spindle 13 suitably supported in the upright portion of the bed and transversely of the main driving shaft. To the front ends of these spindle shafts 13 are secured by tapered shank drill holding chucks 14 for the reception of the drills 15. At one end of the machine one drill chuck spindle carries at the rear end thereof a spur gear 16 in mesh with a larger spur gear 17, to which is secured for rotation therewith a sprocket gear 18 connected by a sprocket chain 19 with a similarly formed sprocket 20 fastened to a clutch member 21 carried by a sleeve 22 loosely mounted upon a transversely extending shaft 23 suitably supported by the bed of the machine at one end thereof, (see Fig. 2).

Keyed to this shaft 23 is a companion clutch member 24 having a grooved end 25 for the reception of a fork or yoke 26 to which is connected a rod 27 pivoted to a lever 28 bolted to the end of the machine frame, the upper end of this lever being connected to a rod 29 having a handle 30 at the outer end thereof, and which last rod is suitably guided at one end of the pan, and by means of which in case of emergency by reason of the breaking of a drill or otherwise, or in setting up the machine, the clutches may be disconnected in a manner which will be obvious, thus stopping the movement of the cam-shaft hereinafter described. At the opposite end of this transverse shaft 23, and on a stub shaft 31, a suitable system of change gears 32 is located, one of these gears being pinned to the opposite end of the sleeve carrying the clutch to which the sprocket is connected. By means of this system of change gears various speeds may be given to the cam shaft hereinafter referred to, in a manner which will be readily understood. Carried by the sleeve 22 mounted on this transverse shaft 23 is a worm 35 in mesh with a worm wheel 36 secured to the end of a cam shaft 37 supported in suitable bearings of the machine bed or frame below the main driving shaft.

From the foregoing it will be obvious that when the main driving shaft is rotated and the clutch members are in engagement the cam shaft just referred to will be rotated at a speed corresponding to the change gears used.

On the cam shaft 37 is fastened a cam disk 38 carrying suitable cams 39 and 40 by means of which the work, in the manner hereinafter described, will be moved toward and from the drills. Loosely mounted on this cam shaft is a cam drum 41 having suitable cam portions 42 and adjustable straps 43 by means of which, in the manner hereinafter described, the work carrier will be shifted lengthwise of the bed of the machine and therefore crosswise of the drills and is adjusted for accurate movement. Fastened to this cam drum (see Fig. 7), but loosely mounted on the cam shaft, is a sleeve 44 carrying a spur gear 45, which spur gear is in mesh with a spur gear 46′ loosely mounted on a stud 47, and fastened to this last spur gear is another spur gear 48 likewise loosely mounted on the stud 47. Fastened to the cam shaft in position to mesh at intervals with the spur gear 48 is a segment gear 50. This mechanism for indexing the cam drum results, as demonstrated in practice, in an actual saving of over fifty per cent. in working time. In other words, with this mechanism at least twice as much work can be done as would be possible without it. That is to say, if the cam drum 41 were fastened directly to the cam shaft 37, and all the gears 46′, 48, 45 and 50 were removed, it will be readily seen that the cam drum 41 would revolve at the same speed as the cam disk 38. In constructing the machine in this way, as the fixture rail must shift from one station to the other, this would necessitate a cam strip with an angle leading toward the right for one direction of shift and another with an angle leading toward the left for the opposite direction of shift, and thus it would be necessary to use half the time of the cam drum to shift the slide or fixture rail 60 in one direction and the other half to shift it in the other direction. This halving of the time of the periphery of the cam drum would also necessitate halving the time of the periphery of the cam disk 38; in other words, there would have to be two cams such as 39 and 40 for each half of the drum. Thus, the lost time, which is of course the time it takes to retract the drills, shift the rail from one station to the other and bring the rail up to the work again ready for drilling, would be double, and in addition, by having two short cams instead of one long cam, would necessitate slowing down the feed to approximately fifty per cent., or one-half slower. In the present mechanism, however, by having the cam drum revolve intermittently on the cam shaft through the hereinbefore described mechanism, the doubling up of the camming on the cam disk 38 is eliminated and the cam portion on the cam drum merely acts as a shifting means for the fixture rail, so that the number of cam portions and adjusting strips are only limited to the steepness of the angle to allow a shift without cramping, and it has been found that six stations for each shift, with an even ratio on the gearing in connection with the segment gear, works satisfactorily. As nearly as it can be calculated there is a saving of time of about fifty per cent. by means of this improved mechanism, because in the use thereof there is only one period of lost time in one revolution of the cam shaft, while in the other method hereinbefore referred to there would be two, as well as the necessity of slowing down the machine to allow for the greater lead on the cam 39. With the cam drum fastened directly to the cam shaft as before explained, drilling through a $\frac{3}{8}$-inch piece with a $\frac{1}{8}$-inch drill, but 900 pieces could be drilled per hour, whereas with this improved mechanism this is increased to 1800 per hour.

Secured to the bed (see Fig. 6), is a post 55 having at its lower end a roller working in a groove 52 of the cam drum 41. By the provision of this means friction of the spur gear 45 against the segment gear 50 is prevented due to the thrust of the lever hereinafter described when the roller thereof is in contact with the cam straps on the cam drum.

Mounted on the bed of the machine within the pan is a slide base 56 having a pair of transverse dovetail guides 57 for the reception of a pair of slides 58 located in parallel alinement and likewise having dovetail guideways for the reception of said guides, one slide being located adjacent to each end of said slide base. Each of these slides 58 has a dovetail guide 59 extending transversely thereof. Located on these dovetail guides 59 is a slide or fixture or jig rail 60 having a dovetail guideway for the reception of the guides 59, this slide 60 being located to move at right angles to the movement of the dovetail slides 58 and forms the work carrying support or reciprocating jig or fixture rail. The slides 58 and 60 form a compound slide, the whole movable toward and from the drills, while the slide 60 is movable transversely of the slide 58 and of the drills, or crosswise thereof, whereby the work to be drilled may be shifted to and from the drills so that one set of pieces after they are drilled may be shifted to one side of the drills to be removed and new pieces inserted in their place, while another set of pieces is being drilled, and which latter set of pieces after being drilled will be shifted to the opposite side of the drills while the undrilled pieces just previously inserted are shifted into position to be drilled. so that in this sense the work is reciprocated or shifted first to one side and then to the other of the drills, while it is also shifted toward and from the drills in the manner about to be described.

For the purpose of shifting the work toward and from the drills, a lever 61 is pivoted on a stud 62 carried on the bed of the machine, (see Figs. 3, 9 and 10). The lower end of this lever has two arms 61' and 61" extending from its fulcrum and the outer end of each of which is provided with a stud and roller 63 one adapted to contact with the lead cam 39 and the other with a takeback cam 40 of the cam disk 38 hereinbefore described, so that when the fixture rail has been fed toward the drills by means of the cam 39 of the cam disk 38 the other arm with its roller 63 will come in contact with cam 40 and reverse or carry back the fixture rail to its initial position or clear of the drills. The upper end of the lever 61 is housed in a milled station of the reciprocating work carrying rail so that when its rollers 63 come in contact with the cams 39 and 40 the reciprocating rail will be shifted gradually toward the drills by the cam 39 and quickly from the drills by cam 40, the amount of such shiftable movement by cam 39 being determined by the character or diameter of the work to be drilled. The character of the cam 40 is fixed and is of such size and design that it will carry the fixture rail back clear of the drills at all times.

For reciprocating or shifting the slide or jig or fixture rail 60 crosswise of the drills, a lever 64 is pivotally bolted to the bed of the machine, (see Figs. 3 and 5), and one end of this lever carries a roller or stud 65 housed in a milled station 66 on the underside of the reciprocating fixture rail 60. To the opposite end of this lever is secured a roller 67 in position to contact at the proper time with the raised cam portions 42 of the cam drum 41, whereby this reciprocating rail will be moved backward and forward, that is reciprocated back and forth lengthwise of the machine. Adjacent to these raised cam portions 42 are adjustable cam straps 43 which are adjustable lengthwise to insure the accurate shifting of the fixture rail.

Bolted to each side of the dovetail guides 57 are stop brackets 57', (see Figs. 1, 2 and 4), in which are housed adjusting screws 157. At the outer ends of the screws are secured protecting caps 158 which cover the exposed ends of the screws and prevent tinkering with the screws when once the machine is accurately lined up. By means of the adjustable cam straps 43, (see Fig. 5), and the adjusting screws 157, (see Fig. 1), the exact shifting of the fixture rail 60 is accomplished. The raised cam portions 42 shift the rail 60 the approximate required distance, and the adjusting straps 43 act as adjusting means or dwells for the accurate stationing of the fixture rail 60 through the means of lever 64. When the roller 65 is against one of the cam straps the fixture rail is also against one of the screws of one of the brackets 57'.

Carried by the reciprocating jig or fixture rail are a series of work holders 73, shown herein as twelve in number, each pair thereof so located that one of each pair will be in position to have its work drilled by one of the drills. Each of these work holders is in the form of a block fastened by means of a pair of headed bolts 74 (see Figs. 11 and 12) to the jig rail, for which purpose the latter is provided with a T-shaped slot 75. At the inner end of each of these blocks is a vertically bored V-shaped portion 76 for the reception of the work to be drilled, as for instance a bolt, and located directly back of the center of the V portion at a suitable distance in the fixture is a gage post 77, to the upper end of which is fastened a stop plate 78 by means of a set screw 78', and the plate is adjustable by this means on the post 77. Through the center of this block and extending rearwardly from the V-shaped bore is located a tension clamp shaft 79. The rear end of each block is enlarged to receive a clamping nut 89 in which is housed a clamping stud 81, and to each of these studs is fastened a depending lever 82, the lower rounded end of each lever 82 being housed in a station 83 (see Fig. 4) of a clamping rail 84 bolted to the front ends of the two transverse slides hereinbefore referred to. To a protruding portion of clamping stud 81 is housed a friction collar 89' pinned to the workholder or block 73 by means of a slot and pin 89'', (see Fig. 11), to keep it from revolving. The pin 89'' is housed in the workholder block 73 and enters a slot in the collar 89'. Adjustable nut 86 is directly against this collar 89', and the clamp shaft enters the bore of this nut. Directly in front of this nut, and on the threaded portion of the clamp shaft 79, is a lock nut 87. In a suitable bore of the workholder block 73 is housed a tension spring 91. The adjusting nut 86 has an extension 86' which has a bearing, and lock nut 87 also has an extension 87' which has a bearing and suitable bore for the spring 91. At the front end of the clamp shaft 79 is milled a groove or keyway 93 in which is housed a screw pin 94, which allows the clamp shaft 79 to move endwise but not circumferentially. Located in alinement with the clamp shaft and housed in front of the block 76 is a drill bushing 88 for guiding the drill. To correctly adjust the fixture rail to hold the work properly, this fixture rail is shifted so that the bushing in the fixture is in alinement with the drill. Before doing this, a piece of work to be drilled is adjusted by means of the gage to the proper height, then the adjusting nut 86 being unscrewed against the face of collar 89' forces the clamp shaft 79 against the work to hold it in position while being drilled. The function of the slot 93 and the pin 94 is to keep the clamp shaft 79 from turning while in operation. The lock nut 87 is then screwed tightly against the extended bearing of adjusting nut 86, and this keeps the adjusting nut 86 from working loose and the extended bearing of lock nut 87 acts as a backing for tension spring 91. When this has been done the work will be held sufficiently tight to allow it to be drilled. When the fixture rail is shifted in the opposite direction, the receding action of the stud 81 through the medium of its coarse thread allows the collar 89' to recede with it through the back pressure of the spring 91 and carry the clamp shaft 79 with it, thus releasing the work so that it can be removed.

From the foregoing it will be observed that when the clamping lever 82 (see Fig. 11) is operated in one direction its clamping shaft will be quickly moved forward against the action of its spring to force the bolt blank into the V-shaped bore and so clamp it during the drilling operation. On the movement of the lever 82 in the opposite direction this clamping action is released, the spring returning the shaft away from its clamping position. Thus it will be observed that in the present improvement all of the clamp shafts are simultaneously operated, but that one half thereof are moved to clamp blanks in position to be drilled while the other half are moved to release previously drilled blanks, and in the present arrangement each alternate one is simultaneously operated to clamp while the remaining ones are simultaneously operated to release blanks, and this result is obtained by a reversal of the threads shown in Fig. 11 on each alternate clamp shaft, that is to say six alternate clamp shafts will have right-hand threads while the remaining ones will have left-hand threads.

In setting up the machine, the jig or fixture rail is reciprocated into position against one of the adjusting screws 157 and then six of the jigs are lined up with the drills by shifting them through the medium of their clamping bolts along the jig rail. Then the jig rail is moved backward and reciprocated so that the other six jigs may be lined up in a similar manner. Thus six jigs are in exact alinement with the drills at each time the jig rail is reciprocated, and a cam of course must be selected to insure that the drills will enter the work the required depth. The desired speed is obtained for the drills by the stepped cone pulley, while the desired speed for the feeding movement of the jig rail is obtained through the change gear mechanism hereinbefore referred to. The blanks to be drilled are then placed one in each of the V-shaped blank receiving openings, the position of the hole to be drilled being determined by the gage-post being set at the desired height. When the first set of six blanks have been drilled the required depth by reason of the forward or feeding movement of the rail toward and from the drills the jig rail is shifted backward from the drills and the instant that it has receded to its initial position this jig rail is moved lengthwise thereof, so that the blanks previously drilled will be carried to one side of the drills while the idle jigs containing undrilled blanks are brought into line with the drills and the jig rail then shifted in the manner just described. This operation continues automatically. The reciprocating of the jig rail into and out of line with the spindles, or from one station to another, in conjunction with the blank clamping means hereinbefore referred to, loosens or releases the blanks in the jigs that have been drilled and tightens or holds the blanks in the jigs that are about to be drilled. So that, in the present improvement, the shifting of the jig rail from one station to another releases six pieces or blanks that have been drilled and tightens six undrilled pieces that are in readiness to be drilled.

From the foregoing it will be observed that the organization is such that each jig or blank holder of a pair is alternately brought into position to have its blank drilled. For instance, taking the two jigs or blank holders at the right of Fig. 1, it will be observed that one jig or blank holder is in position to have its blank drilled and that after it is drilled it will be shifted backward and then to the right, this action bringing its companion jig or blank holder, shown located in its idle position, to the right and into position to have its blank drilled, after which it will be carried to the left into its present or idle position, while the first jig or blank holder will have been brought to the left and into the position shown in the drawing. Thus it will be observed that one jig or blank holder of each pair is shifted to one side of the drill after the blank has been drilled in order that this blank may be removed and a new blank inserted, while the other jig or blank holder of the pair will be shifted to the other side of the drill, so that they are alternately carried into position to have the blanks thereof drilled.

I claim as my invention:

1. In a metal working machine, the combination of a series of tools, a series of work holders in excess of the number of tools, means for shifting one series thereof toward and from the other, and means for shifting one series thereof transversely relatively to the other alternately back and forth whereby some of the work holders will be in position to have their blanks operated upon while others are in position to be filled while such operation is proceeding.

2. In a metal working machine, the combination of a series of tools, a series of work holders comprising twice the number of tools, means for shifting one series thereof toward and from the other, and means for shifting one series thereof transversely relatively to the other in a straight path whereby one half of the work holders will be in position to have their blanks operated upon while the other half thereof are in position to be filled during such operation.

3. In a metal working machine, the combination of a series of tools, a series of work holders comprising twice the number of tools, means for shifting one series thereof toward and from the other, and means for shifting one series thereof alternately back and forth so that one of each pair of work holders will be alternately brought into position opposite a tool whereby one half of the work holders will be in position to have their blanks operated upon while the other half are in position to have blanks inserted therein.

4. In a metal working machine, the combination of a series of drills, means for simultaneously rotating them, a series of work holders comprising twice the number of the drills, means for shifting one series thereof toward and from the other, and means for reciprocating one series thereof relatively to the other whereby some of the work holders will be in position to have their blanks operated upon while others are in position to be filled while such operation is proceeding.

5. In a metal working machine, the combination of a series of drills, means for simultaneously rotating said drills, a series of work holders comprising twice the number of drills, means for shifting one series thereof toward and from the other, and means for reciprocating one series thereof so that each pair of work holders will be alternately brought into position opposite a drill whereby one half of the work holders will be in position to have their blanks operated upon while the other half are in position to have blanks inserted therein.

6. In a machine of the class described, the combination of a series of tools, a series of work holders in excess of the number of tools, means for shifting the work holders toward and from the tools, and means for reciprocating the work holders alternately back and forth crosswise of the tools whereby some of the work holders will be in position to have their blanks operated upon while others are in position to be filled during such operation.

7. In a machine of the class described, the combination of a series of drills, means for simultaneously rotating the drills, a series of work holders comprising twice the number of drills, means for shifting the work holders toward and from the drills, and means for reciprocating the work holders relatively to the drills so that one of each pair of work holders will be alternately brought into position opposite a drill whereby one half of the work holders will be in position to have their blanks operated upon while the other half are in position to have blanks inserted therein.

8. In a machine of the class described, the combination of a series of six drills, means for simultaneously rotating said drills, a series of twelve work holders, means for shifting the work holders toward and from the drills, and means for shifting the work holders in a straight path into and out of line with the drills whereby six of the work holders will be in position to have their blanks drilled while the remaining six are in position to be filled during such operation.

9. In a metal working machine, the combination of a series of tools, a series of work holders, and means for reciprocating one series thereof in transverse directions relatively to the other.

10. In a metal working machine, the combination of a series of drills, a series of work holders, and means for reciprocating said work holders in transverse directions relatively to the drills.

11. In a metal working machine, the combination of a series of six drills, a series of twelve work holders, and means for shifting the work holders in transverse directions in straight paths relatively to the drills.

12. In a metal working machine, the combination of a series of tools, a series of work holders in excess of the number of tools, means for shifting one series thereof toward and from the other, means for shifting one series thereof transversely relatively to the other whereby some of the work holders will be in position to have their blanks operated upon while others are in position to be filled while such operation is proceeding and for decreasing the lost time of the shiftable series during a predetermined time.

13. In a metal working machine, the combination of a series of tools, a series of work holders comprising twice the number of tools, means for shifting one series thereof toward and from the other, means for shifting one series thereof so that one of each pair of work holders will be alternately brought into position opposite a tool whereby one half of the work holders will be in position to have their blanks operated upon while the other half are in position to have blanks inserted therein and for decreasing the lost time of the shiftable series during a predetermined time.

14. In a metal working machine, the combination of a series of drills, means for simultaneously rotating them, a series of work holders comprising twice the number of the drills, means for shifting one series thereof toward and from the other, means for shifting one series thereof relatively to the other whereby some of the work holders will be in position to have their blanks operated upon while others are in position to be filled while such operation is proceeding and for decreasing the lost time of the shiftable series during a predetermined time.

15. In a machine of the class described, the combination of a series of drills, means for simultaneously rotating the drills, a series of work holders comprising twice the number of drills, means for shifting the work holders toward and from the drills, means for shifting the work holders relatively to the drills so that one of each pair of work holders will be alternately brought into position opposite a drill whereby one half of the work holders will be in position to have their blanks operated upon while the other half are in position to have blanks inserted therein and for decreasing the lost time of the work holders during a predetermined time.

16. In a metal working machine, the combination of a series of tools, a series of work holders, means for shifting one series thereof in transverse directions relatively to the other and for decreasing the lost time of the shiftable series during a part of the movement thereof.

17. In a metal working machine, the combination of a series of drills, a series of work holders, means for shifting said work holders in transverse directions relatively to the drills and for decreasing the lost time of the work holders during a predetermined time.

18. In a machine of the class described, the combination of a series of six drills, means for simultaneously rotating said drills, a series of twelve work holders, means for shifting the work holders toward and from the drills, means for shifting the work holders into and out of line with the drills whereby six of the work holders will be in position to have their blanks drilled while the remaining six are in position to be filled during such operation and for decreasing the lost time of the work holders during a predetermined time.

19. In a metal working machine, the combination of a series of tools, a series of work holders in excess of the number of tools, means for shifting one series thereof toward and from the other, means for shifting one series thereof transversely relatively to the other alternately back and forth whereby some of the work holders will be in position to have their blanks operated upon while others are in position to be filled while such operation is proceeding, and means for automatically clamping and releasing blanks in said work holders.

20. In a metal working machine, the combination of a series of tools, a series of work holders comprising twice the number of tools, means for shifting one series thereof toward and from the other, means for shifting one series thereof alternately back and forth so that one of each pair of work holders will be alternately brought into position opposite a tool whereby one half of the work holders will be in position to have their blanks operated upon while the other half are in position to have blanks inserted therein, and means for automatically clamping and releasing blanks in said work holders.

21. In a metal working machine, the combination of a series of drills, means for simultaneously rotating them, a series of work holders comprising twice the number of the drills, means for shifting one series thereof toward and from the other, means for reciprocating one series thereof relatively to the other whereby some of the work holders will be in position to have their blanks operated upon while others are in position to be filled while such operation is proceeding, and means for automatically clamping and releasing blanks in said work holders.

22. In a machine of the class described, the combination of a series of drills, means for simultaneously rotating the drills, a series of work holders comprising twice the number of drills, means for shifting the work holders toward and from the drills, means for reciprocating the work holders relatively to the drills so that one of each pair of work holders will be alternately brought into position opposite a drill whereby one half of the work holders will be in position to have their blanks operated upon while the other half are in position to have blanks inserted therein, and means for automatically clamping and releasing blanks in said work holders.

23. In a metal working machine, the combination of a series of tools, a series of work holders, means for shifting one series thereof in transverse directions in straight paths relatively to the other, and means for automatically clamping and releasing blanks in said work holders.

24. In a metal working machine, the combination of a series of drills, a series of work holders, means for shifting said work holders in transverse directions in straight paths relatively to the drills, and means for automatically clamping and releasing blanks in said work holders.

25. In a machine of the class described, the combination of a series of six drills, means for simultaneously rotating said drills, a series of twelve work holders, means for shifting the work holders toward and from the drills, means for shifting the work holders alternately back and forth into and out of line with the drills whereby six of the work holders will be in position to have their blanks drilled while the remaining six are in position to be filled during such operation, and means for automatically clamping and releasing blanks in said work holders.

26. In a metal working machine, the combination of a series of tools, a series of work holders comprising twice the number of tools, means for shifting one series thereof toward and from the other, means for shifting one series thereof so that one of each pair of work holders will be alternately brought into position opposite a tool whereby one half of the work holders will be in position to have their blanks operated upon while the other half are in position to have blanks inserted therein and for decreasing the lost time of the shiftable series during a predetermined time, and means for automatically clamping and releasing blanks in said work holders.

27. In a machine of the class described, the combination of a series of drills, means for simultaneously rotating the drills, a series of work holders comprising twice the number of drills, means for shifting the work holders toward and from the drills, means for shifting the work holders relatively to the drills so that one of each pair of work holders will be alternately brought into position opposite a drill whereby one half of the work holders will be in position to have their blanks operated upon while the other half are in position to have blanks inserted therein and for decreasing the lost time of the work holders during a predetermined time, and means for automatically clamping and releasing blanks in said work holders.

28. In a metal working machine, the combination of a series of tools, a series of work holders, means for shifting one series thereof in transverse directions relatively to the other and for decreasing the lost time of the shiftable series during a predetermined time, and means for automatically clamping and releasing blanks in said work holders.

29. In a metal working machine, the combination of a series of drills, a series of work holders, means for shifting said work holders in transverse directions relatively to the drills and for decreasing the lost time of the work holders during a predetermined time, and means for automatically clamping and releasing blanks in said work holders.

30. In a machine of the class described, the combination of a series of drills, means for simultaneously rotating the drills, a duplicate series of work holders, means for feeding the work holders toward and from the drills, and means for reciprocating the work holders alternately back and forth relatively to the drills so that alternate work-holders will be opposite the drills while the other work-holders are in idle positions in readiness to be filled.

31. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of the work holders during a predetermined time.

32. In a machine of the class described, the combination of a series of drills, means for simultaneously rotating the drills, a duplicate series of work holders, means for feeding the work holders toward and from the drills, means for reciprocating the work holders relatively to the drills so that alternate work-holders will be opposite the drills while the other work-holders are in idle positions in readiness to be filled, and means for automatically clamping and releasing blanks in said work holders.

33. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of the work holders during a predetermined time, and means for automatically clamping and releasing blanks in said work holders.

34. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled, and means for locating the position of the work holders relatively to the drills.

35. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled, means for locating the position of the work holders relatively to the drills, means for automatically clamping and releasing blanks in the work holders, and means including a part of said work holder shifting means for decreasing the lost time of the work holders during a predetermined time.

36. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled, and means for locating the position of the blanks inserted into said work holders.

37. In a machine of the class described, the combination of a series of drills, means for simultaneously rotating the drills, a duplicate series of work holders, means for feeding the work holders toward and from the drills, means for reciprocating the work holders relatively to the drills so that alternate work-holders will be opposite the drills while the other work-holders are in idle positions in readiness to be filled, means for locating the blanks inserted into said work holders, means for automatically clamping and releasing blanks in said work holders, means for locating the position of the work holders relatively to the drills, and means including a part of said work holder reciprocating means for decreasing the lost time of the work holders during a predetermined time.

38. In a machine of the class described, the combination of a series of drills, means for simultaneously rotating the drills, a duplicate series of work holders, means for feeding the work holders toward and from the drills, means for reciprocating the work holders relatively to the drills so that alternate work-holders will be opposite the drills while the other work-holders are in idle positions in readiness to be filled, means for locating the blanks inserted into said work holders, means for automatically clamping and releasing blanks in said work holders, means for locating the position of the work holders relatively to the drills, and means for varying the speed of movement of said work holders.

39. In a machine of the class described, the combination of a series of drills, means for simultaneously rotating the drills, a duplicate series of work holders, means for feeding the work holders toward and from the drills, means for reciprocating the work holders relatively to the drills so that alternate work-holders will be opposite the drills while the other work-holders are in idle positions in readiness to be filled, and means for varying the speed of movement of said work holders.

40. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of said work holders during a predetermined time and comprising a cam shaft, a cam drum loosely mounted thereon, and means coöperating with said cam shaft for intermittently operating said cam drum at a predetermined time.

41. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of said work holders during a predetermined time and comprising a cam shaft, a cam drum loosely mounted thereon, a spur gear loosely mounted on said cam shaft and fixed to said cam drum, a sector gear fixed to said cam shaft, and gears for communicating motion from said sector gear to said loosely mounted gear.

42. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of said work holders during a predetermined time and comprising a cam shaft, a cam drum loosely mounted thereon, a spur gear loosely mounted on said cam shaft and fixed to said cam drum, a sector gear fixed to said cam shaft, gears for communicating motion from said sector gear to said loosely mounted gear, and means carried by said cam shaft for feeding said work holders toward and from the drills.

43. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of said work holders during a predetermined time and comprising a cam shaft, a cam drum loosely mounted thereon, means coöperating with said cam shaft for intermittently operating said cam drum at a predetermined time, means for rotating said cam shaft, and means for varying the speed thereof.

44. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of said work holders during a predetermined time and comprising a cam shaft, a cam drum loosely mounted thereon, a spur gear loosely mounted on said cam shaft and fixed to said cam drum, a sector gear fixed to said cam shaft, gears for communicating motion from said sector gear to said loosely mounted gear, means for rotating said cam shaft, and means for varying the speed thereof.

45. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of said work holders during a predetermined time and comprising a cam shaft, a cam drum loosely mounted thereon, a spur gear loosely mounted on said cam shaft and fixed to said cam drum, a sector gear fixed to said cam shaft, gears for communicating motion from said sector gear to said loosely mounted gear, means carried by said cam shaft for feeding said work holders toward and from the drills, means for rotating said cam shaft, and means for varying the speed thereof.

46. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of said work holders during a predetermined time and comprising a cam shaft, a cam drum loosely mounted thereon, means coöperating with said cam shaft for intermittently operating said cam drum at a predetermined time, and means for imparting motion from the same source of power from which said drills are rotated for rotating the cam shaft.

47. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of said work holders during a predetermined time and comprising a cam shaft, a cam drum loosely mounted thereon, a spur gear loosely mounted on said cam shaft and fixed to said cam drum, a sector gear fixed to said cam shaft, gears for communicating motion from said sector gear to said loosely mounted gear, means carried by said cam shaft for feeding said work holders toward and from the drills, and means for imparting motion from the same source of power from which said drills are rotated for rotating the cam shaft.

48. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of the work holders during a predetermined time and comprising a cam shaft, a cam drum loosely mounted thereon, means operated by said cam shaft for rotating said drum intermittently, and means for rotating said cam shaft.

49. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of the work holders during a predetermined time and comprising a cam shaft, a cam drum loosely mounted thereon, means operated by said cam shaft for rotating said drum intermittently, means for rotating said cam shaft, and connecting means between the drill rotating means and the cam shaft rotating means.

50. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of the work holders during a predetermined time and comprising a cam shaft, a cam drum loosely mounted thereon, means operated by said cam shaft for rotating said drum intermittently, means for rotating said cam shaft, and connecting means between the drill rotating means and the cam shaft rotating means and including clutch mechanism whereby the movement of the cam shaft may be stopped at will.

51. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled and for decreasing the lost time of the work holders during a predetermined time and comprising a cam shaft, a cam drum loosely mounted thereon, means operated by said cam shaft for rotating said drum intermittently, means for rotating said cam shaft, connecting means between the drill rotating means and the cam shaft rotating means and including clutch mechanism whereby the movement of the cam shaft may be stopped at will, and means for varying the speed of the cam shaft.

52. In a machine of the class described, the combination of a series of drills, means for simultaneously rotating said drills, a duplicate series of work holders, means for feeding the work holders toward and from the drills, means for reciprocating the work holders relatively to the drills so that alternate work-holders will be opposite the drills while the other work-holders are in idle positions in readiness to be filled, and a compound slide for carrying said work holders.

53. In a machine of the class described, the combination of a series of drills, means for simultaneously rotating said drills, a duplicate series of work holders, means for feeding the work holders toward and from the drills, means for reciprocating the work holders relatively to the drills so that alternate work-holders will be opposite the drills while the other work-holders are in idle positions in readiness to be filled, a compound slide for carrying said work holders, and means for automatically clamping and releasing the blanks in said work holders.

54. In a machine of the class described, the combination of a series of drills, means for simultaneously rotating said drills, a duplicate series of work holders, means for feeding the work holders toward and from the drills, means for reciprocating the work holders relatively to the drills so that alternate work-holders will be opposite the drills while the other work-holders are in idle positions in readiness to be filled, a compound slide for carrying said work holders, means for automatically clamping and releasing the blanks in each of said work holders and comprising a rotatable clamp shaft, an oscillating arm connected therewith, and means for operating said arm.

55. In a machine of the class described, the combination of a series of drills, means for simultaneously rotating said drills, a duplicate series of work holders, means for feeding the work holders toward and from the drills, means for reciprocating the work holders relatively to the drills so that alternate work-holders will be opposite the drills while the other work-holders are in idle positions in readiness to be filled, a compound slide for carrying said work holders, means for automatically clamping and releasing the blanks in each of said work holders and comprising a rotatable clamp shaft, an oscillating arm connected therewith, and means for operating said arm and comprising a member connected with said compound slide.

56. In a machine of the class described, the combination of a series of drills, means for simultaneously rotating said drills, a duplicate series of work holders, means for feeding the work holders toward and from the drills, means for reciprocating the work holders relatively to the drills so that alternate work-holders will be opposite the drills while the other work-holders are in idle positions in readiness to be filled, a compound slide for carrying said work holders, means for automatically clamping and releasing the blanks in each of said work holders and comprising a rotatable clamp shaft, an oscillating arm connected therewith, means for operating said arm and comprising a member connected with said compound slide, and a spring for pressing said shaft in one direction.

57. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled, and an adjustable gage carried by each of said work holders for positioning the blanks therein.

58. In a machine of the class described, the combination of a series of drills, means for simultaneously rotating said drills, a duplicate series of work holders, means for feeding the work holders toward and from the drills, means for reciprocating the work holders relatively to the drills so that alternate work-holders will be opposite the drills while the other work-holders are in idle positions in readiness to be filled, and locating means in position to aline the work holders relatively to the drills.

59. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled, a cam shaft, means for rotating it, and means carried by said cam shaft and including a part of said work holder shifting means for decreasing the lost time of the work holders during a predetermined time.

60. In a machine of the class described, the combination of a series of drills, means for simultaneously rotating said drills, a duplicate series of work holders, a cam shaft, means for rotating it, means operated from the cam shaft for feeding the work holders toward and from the drills, means operated from the cam shaft for shifting the work holders relatively to the drills so that alternate work-holders will be opposite the drills while the other work-holders are in idle positions in readiness to be filled and for decreasing the lost time of the work holders during a predetermined time.

61. In a machine of the class described, the combination of a series of drills, means for simultaneously rotating said drills, a duplicate series of work holders, a cam shaft, means for rotating it, means operated from the cam shaft for feeding the work holders toward and from the drills, means operated from the cam shaft for reciprocating the work holders relatively to the drills so that alternate work-holders will be opposite the drills while the other work-holders are in idle positions in readiness to be filled and for decreasing the lost time of the work holders during a predetermined time, and means for automatically clamping and releasing the blanks in the work holders during the reciprocatory movement of such work holders.

62. In a machine of the class described, the combination of a series of drills, means for simultaneously rotating said drills, a duplicate series of work holders, a cam shaft, means for rotating it, means operated from the cam shaft for feeding the work holders toward and from the drills, means operated from the cam shaft for reciprocating the work holders relatively to the drills so that alternate work-holders will be opposite the drills while the other work-holders are in idle positions in readiness to be filled and for decreasing the lost time of the work holders during a predetermined time, and means for automatically clamping and releasing the blanks in each of the work holders during the reciprocatory movement of such work holders and comprising an oscillatory clamp shaft.

63. In a machine of the class described, the combination of a series of drills, means for simultaneously rotating said drills, a duplicate series of work holders, means for feeding the work holders toward and from the drills, and means for shifting the work holders relatively to the drills so that alternate work-holders will be opposite the drills while the other work-holders are in idle positions in readiness to be filled, said feeding and shifting means comprising cam shaft mechanism and means for rotating it.

64. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled, said feeding and shifting means comprising cam shaft mechanism and means for rotating it, and means for varying the speed of said cam shaft.

65. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled, said feeding and shifting means comprising cam shaft mechanism, means for rotating it and means for decreasing the lost time of a part of said cam shaft mechanism thereby to decrease the lost time of the work holders.

66. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled, said feeding and shifting means comprising cam shaft mechanism, means for rotating it and means for decreasing the lost time of a part of said cam shaft mechanism thereby to decrease the lost time of the work holders, and means for varying the speed of said cam shaft.

67. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled, said feeding and shifting means comprising cam shaft mechanism, means for rotating it and means for decreasing the lost time of a part of said cam shaft mechanism thereby to decrease the lost time of the work holders, and oscillatory means for automatically clamping and releasing the blanks in the work holders.

68. In a machine of the class described, the combination of a series of drills, means for simultaneously rotating said drills, a duplicate series of work holders, means for feeding the work holders toward and from the drills, means for shifting the work holders relatively to the drills so that alternate work-holders will be opposite the drills while the other work-holders are in idle positions in readiness to be filled, said feeding and shifting means comprising cam shaft mechanism, means for rotating it and means for decreasing the lost time of a part of said cam shaft mechanism thereby to decrease the lost time of the work holders, means for varying the speed of said cam shaft, and shiftable means for automatically clamping and releasing the blanks in the work holders.

69. In a machine of the class described, the combination of a series of drills, means for simultaneously rotating said drills, a duplicate series of work holders, means for feeding the work holders toward and from the drills, means for reciprocating the work holders relatively to the drills so that alternate work-holders will be opposite the drills while the other work-holders are in idle positions in readiness to be filled, said feeding and reciprocating means comprising cam shaft mechanism, means for rotating it and means for decreasing the lost time of a part of said cam shaft mechanism thereby to decrease the lost time of the work holders, means for varying the speed of said cam shaft, and shiftable means for automatically clamping and releasing the blanks in the work holders, the means for feeding and reciprocating said work holders including a compound slide.

70. In a machine of the class described, the combination of a series of drills, means for rotating said drills, a compound slide, a cam shaft, means connected with the drill rotating means for rotating said cam shaft and including clutch mechanism and a worm and worm wheel, cam mechanism located on said cam shaft for feeding said slide toward and from the drills, cam mechanism mounted on said cam shaft for reciprocating a part of said slide and including means for decreasing the lost time thereof, and blank holders carried by said compound slide.

71. In a machine of the class described, the combination of a series of drills, means for rotating said drills, a compound slide, a cam shaft, means connected with the drill rotating means for rotating said cam shaft and including clutch mechanism and a worm and worm wheel, cam mechanism located on said cam shaft for feeding said slide toward and from the drills, cam mechanism mounted on said cam shaft for reciprocating a part of said slide and including means for decreasing the lost time thereof and including a loosely mounted cam drum and means fixed to said cam shaft for rotating said cam drum intermittently, and blank holders carried by said compound slide.

72. In a machine of the class described, the combination of a series of drills, means for rotating said drills, a compound slide, a cam shaft, means connected with the drill rotating means for rotating said cam shaft and including clutch mechanism and a worm and worm wheel, cam mechanism located on said cam shaft for feeding said slide toward and from the drills, cam mechanism mounted on said cam shaft for reciprocating a part of said slide and including means for decreasing the lost time thereof and including a loosely mounted cam drum and means fixed to said cam shaft for rotating said cam drum intermittently, blank holders carried by said compound slide, a reciprocating clamp shaft carried by each of said blank holders, and means connecting each of said clamp shafts with the compound slide for automatically clamping and releasing the blanks in the blank holders.

73. In a machine of the class described, the combination of a series of drills, means for simultaneously rotating the drills, a duplicate series of work holders, means for feeding the work holders toward and from the drills, means for shifting the work holders relatively to the drills so that alternate work holders will be opposite the drills while other work holders are in idle positions in readiness to be filled, and means for simultaneously clamping blanks in one half of said work holders and simultaneously releasing blanks in the other half thereof.

74. In a machine of the class described, the combination of a series of drills, means for simultaneously rotating the drills, a duplicate series of work holders, means for feeding the work holders toward and from the drills, means for reciprocating the work holders relatively to the drills so that alternate work-holders will be opposite the drills while the other work-holders are in idle positions in readiness to be filled, and means for simultaneously clamping blanks in one half of said work holders and simultaneously releasing blanks in the other half thereof, each of said clamping and releasing means including a reciprocatory clamp shaft.

75. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled, and means for simultaneously clamping blanks in one half of said work holders and simultaneously releasing blanks in the other half thereof, each of said clamping and releasing means including a reciprocatory clamp shaft, each alternate clamp shaft having a right-hand threaded portion and its companion clamp shafts a left-hand threaded portion.

76. In a machine of the class described, the combination of a series of drills, means for simultaneously rotating the drills, a duplicate series of work holders, means for feeding the work holders toward and from the drills, means for shifting the work holders relatively to the drills so that alternate work-holders will be opposite the drills while the other work-holders are in idle positions in readiness to be filled, and means for simultaneously clamping the blanks in each alternate work holder while simultaneously releasing the blanks in the other work holders.

77. In a metal working machine, a non-rotatable blank holder, means for clamping and releasing a blank therein and comprising a reciprocatory shaft, and means for reciprocating said shaft.

78. In a metal working machine, a non-rotatable blank holder, means for clamping and releasing a blank therein and comprising a reciprocatory shaft, means for reciprocating said shaft, and a spring for pressing said shaft in one direction.

79. In a metal working machine, a blank holder, means for clamping and releasing a blank therein and comprising a reciprocatory shaft, means for reciprocating said shaft and including a quick acting thread member connected with said shaft, and a similarly formed member carried by said blank holder and coöperating with said member.

80. In a metal working machine, a blank holder, means for clamping and releasing a blank therein and comprising a reciprocatory shaft, means for reciprocating said shaft and including a quick acting thread member connected with said shaft, a similarly formed member carried by said blank holder and coöperating with said member, and a tension spring carried by said shaft to facilitate the release of the blanks.

81. In a metal working machine, a blank holder, means for clamping and releasing a blank therein and comprising a reciprocatory shaft, means for reciprocating said shaft and including a quick acting thread member connected with said shaft, a similarly formed member carried by said blank holder and coöperating with said member, a tension spring carried by said shaft to facilitate the release of the blanks and means for adjusting the lengthwise position of the shaft.

82. In a metal working machine, the combination of a non-rotatable blank holder, means for clamping and releasing a blank therein and comprising a reciprocatory shaft, a lever connected with said shaft for reciprocating it, and means for shifting said lever.

83. In a multiplex drilling machine, the combination of a plurality of drills, a plurality of blank holders, means for clamping and releasing the blanks and comprising a clamp shaft carried by each of said blank holders, and means for oscillating said clamp shafts, said means organized to oscillate certain of said clamp shafts in one direction and others thereof in the opposite direction simultaneously.

84. In a drilling machine, the combination of drills and blank holders, means for rotating the drills, and means for shifting the blank holders into position to have the blanks therein drilled and for decreasing at a predetermined period the lost time of said blank holders.

85. In a drilling machine, the combination of drills and blank holders, means for rotating the drills, means for shifting the blank holders into position to have the blanks therein drilled, and for decreasing at a predetermined period the lost time of said blank holders and comprising a cam shaft, means for rotating it, a cam drum loosely mounted thereon, and means for intermittently rotating said cam drum.

86. In a drilling machine, the combination of drills and blank holders, means for rotating the drills, means for shifting the blank holders into position to have the blanks therein drilled and for decreasing at a predetermined period the lost time of said blank holders, and means for simultaneously clamping blanks in some of the blank holders while releasing blanks from other of the blank holders.

87. In a metal working machine, the combination of a series of tools, a series of work holders, means for shifting one series thereof in transverse directions relatively to the other and for decreasing the lost time of the shiftable series during a predetermined time and comprising cam shaft mechanism including a cam shaft, means for rotating it at a constant speed, and means receiving its motion from and rotatable intermittently relatively to said cam shaft for the purpose set forth.

88. In a metal working machine, the combination of a series of tools, a series of work holders, means for shifting said work holders in transverse directions relatively to the tools and for decreasing the lost time of the work holders during a predetermined time and including cam shaft mechanism, means for rotating the cam shaft at a constant speed, and means receiving its motion from and rotatable intermittently relatively to said cam shaft for the purpose set forth.

89. In a metal working machine, the combination of a series of tools, a duplicate series of work holders, means for shifting said work holders in transverse directions relatively to the tools and for decreasing the lost time of the work holders during a predetermined time and including cam shaft mechanism, means for rotating the cam shaft at a constant speed, and means receiving its motion from and rotatable intermittently relatively to said cam shaft for the purpose set forth.

90. In a multiplex drilling machine, the combination of a drill, a pair of work holders, means for reciprocating the drill and the work holders relatively to each other in transverse directions in straight paths whereby one of the work holders will be in position to have its blank operated upon while the other is in position to be filled while such drilling is proceeding, and means for rotating the drill and the work holders relatively to each other.

91. In a multiplex drilling machine, the combination of a drill, a pair of work holders, means for reciprocating the drill and the work holders relatively to each other in transverse directions in straight paths whereby one of the work holders will be in position to have its blank operated upon while the other is in position to be filled while such drilling is proceeding, means for rotating the drill and the work holders relatively to each other, and means for automatically clamping and releasing the blanks in the work holders.

92. In a multiplex drilling machine, the combination of a drill, a pair of work holders, means for shifting the drill and the work holders relatively to each other in transverse directions whereby one of the work holders will be in position to have its blank operated upon while the other is in position to be filled while such drilling is proceeding, means for rotating the drill and the work holders relatively to each other, said shifting means including a cam shaft, means for rotating said cam shaft, and means receiving its motion from and rotatable intermittently relatively to said cam shaft for the purpose set forth.

Signed at Cleveland, in the county of Cuyahoga and State of Ohio, this 31st day of July, 1916.

OSCAR A. SMITH.